US009476481B2

(12) United States Patent
Riegger et al.

(10) Patent No.: US 9,476,481 B2
(45) Date of Patent: Oct. 25, 2016

(54) DRIVE CHAIN

(71) Applicant: Ford Global Technologies, LLC, Dearborn, MI (US)

(72) Inventors: John Christopher Riegger, Ann Arbor, MI (US); Jeffrey D. Fluharty, Woodhaven, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 211 days.

(21) Appl. No.: 14/253,566

(22) Filed: Apr. 15, 2014

(65) Prior Publication Data

US 2015/0292598 A1 Oct. 15, 2015

(51) Int. Cl.
*F16G 15/12* (2006.01)
*F16G 13/08* (2006.01)

(52) U.S. Cl.
CPC ............... *F16G 15/12* (2013.01); *F16G 13/08* (2013.01)

(58) Field of Classification Search
CPC .................... F16G 13/20; F16H 7/06
USPC ........................................ 474/213
See application file for complete search history.

(56) References Cited

U.S. PATENT DOCUMENTS

| 867,208 | A | * | 9/1907 | McIntyre | F16G 13/04 305/196 |
| 1,086,146 | A | * | 2/1914 | Dodge | F16G 13/04 474/157 |
| 2,816,453 | A | * | 12/1957 | Frank | F16C 11/045 198/833 |
| 4,925,016 | A | * | 5/1990 | Lapeyre | B65G 17/08 198/834 |
| 5,826,705 | A | * | 10/1998 | Ramsey | B65G 17/08 198/853 |
| 5,989,140 | A | * | 11/1999 | Ichikawa | F16H 7/06 474/148 |
| 6,244,983 | B1 | * | 6/2001 | Matsuda | F16G 13/04 474/155 |
| RE38,607 | E | * | 10/2004 | Guldenfels | B65G 17/08 198/834 |
| 7,097,030 | B2 | * | 8/2006 | Gundlach | B65G 17/08 198/834 |
| 7,137,917 | B2 | * | 11/2006 | Meyer | B65G 23/06 198/850 |
| 2005/0119079 | A1 | | 6/2005 | Okabe | |

FOREIGN PATENT DOCUMENTS

| CN | 102287483 | 12/2011 |
| CN | 202188066 | 4/2012 |
| DE | 102005009154 | 9/2006 |

* cited by examiner

*Primary Examiner* — Michael Mansen
*Assistant Examiner* — Mark K Buse
(74) *Attorney, Agent, or Firm* — Greg P. Brown; Brooks Kushman P.C.

(57) ABSTRACT

Exemplary arrangements for drive chains are disclosed. In one exemplary arrangement, a tooth shaped link member for a drive chain comprises a web portion, a first side tooth, a second side tooth and a central guide tooth. The web portion extends between opposing side portions of the link member. The first side tooth and the second side tooth each include an apex that is oriented at an angle to extend toward the central guide tooth. In another exemplary arrangement, a drive chain comprises a plurality of inner links that are operatively connected to a plurality of outer links, where a pair of rollers are mounted between the inner links with a pin being positioned between the rollers.

13 Claims, 8 Drawing Sheets

DRIVE CHAIN

TECHNICAL FIELD

The present disclosure relates to driving chains, including, but not limited to, silent chains and roller chains that may be configured for power transmission in a vehicle, industrial machine or conveyor.

BACKGROUND

Currently the most common drive chains are the inverted tooth silent chain and roller chains. The inverted tooth silent chains are often utilized with sprockets in automotive applications, such as transmissions, transfer cases, engine timing systems and the like. As shown in the prior art example in FIG. 1A, inverted tooth silent chains 10 are formed by an arrangement of meshing link plates 12a and guide link plates 12b that extend in lateral and longitudinal directions. The link plates 12a, 12b are interlaced and joined by pins 14, which allow pivoting of the plates 12a, 12b about the pins 14. The meshing link plates 12a are configured with teeth members that mate with and contact the teeth 16 of a sprocket 18 to provide power transmission. The guide links 12b are configured to maintain the chain 10 on the center of the sprocket 18. When viewed in the lateral direction (as illustrated in FIG. 1B), a typical chain 10 includes a number of meshing link plates 12a alternated with a number of guide link plates 12b disposed on the outer edges of the chain 10. Meshing link plates 12a are also arranged in an overlapping manner. For example, in the configuration shown in FIG. 1B, meshing link plates 12a' are arranged in an overlapping manner with meshing link plates 12a" that are disposed between meshing link plates 12a'.

Referring to FIGS. 2A-2C, roller chain 20 designs are linkwise formed by an arrangement of meshing link plates. More specifically, roller chain 20 designs include a series of inner links 22 (an example of which is shown in FIG. 2B) and outer links 24 (an example of which is shown in FIG. 2C). The inner links 22 include a pair of cylindrical bushings 26 that are disposed within bushing holes 28 in a pair of inner plates 30, and rollers 32 that are rotatable on the bushings 26. The outer links 24 include two pins 34 that are secured to pin holes 36 in a pair of outer plates 38. One of the pins 34 of an outer link 24a is configured to extend through one of the bushings 26 of an adjacent inner link 22a, while the other pin 34 of the outer link 24 is configured to extend through a bushing 26 of a second adjacent inner link 22b, as shown in FIG. 2A. The outer plates 38 of the outer links 24 are disposed on the outside of the adjacent inner links 22a, 22b. The pins 34 and bushings 26 are designed to be relatively rotatable. The roller chain 20 meshes with gear teeth of sprockets such that a roller 32 is configured to be disposed within each groove formed between adjacent gear teeth of the sprockets.

Durability of drive chains are dependent on wear from the chain link to guide plates contact for inverted tooth silent chains and chain link to chain pin contact for roller chains. Link wear may also contribute to tooth wear.

Chain stretch is also a durability concern. Chain stretch is a result of material wear on the bushings or pins in a chain. As the material wears away from these surfaces, a chain will gradually elongate.

This disclosure is directed to addressing the above problems and other problems as summarized below.

SUMMARY

In one exemplary arrangement, a tooth shaped link member for a drive chain is described. The exemplary tooth shaped link member comprises a web portion, a first side tooth, a second side tooth and a central guide tooth. The web portion extends between opposing side portions of the link member. The first side tooth and the second side tooth each include an apex that is oriented at an angle to extend toward the central guide tooth.

In another exemplary arrangement, a drive chain is disclosed. The exemplary drive chain comprises a first series of inner link plates; a second series of inner link plates, and a plurality of pins. Each of the inner link plates of the first and second series of inner link plates comprise a web portion that extends between opposing side portions, a first side tooth, a second side tooth; and a central guide tooth. The first side tooth is separated from the central guide tooth by a first groove and the central guide tooth is separated from the second side tooth by a second groove. The first and second side teeth each include an apex that is oriented at an angle to extend toward the central guide tooth. The first series of inner link plates are operatively connected to the second series of inner link plates by the pins such that a portion of the first series of inner link plates overlaps with a portion of the second series of inner link plates so as form an endless loop.

In yet another exemplary arrangement a drive chain is disclosed that comprises a plurality of inner links that are operatively connected to a plurality of outer links. Each of the inner links comprises a pair of inner plates arranged in an opposing manner with a first bushing operatively positioned between and connected to the pair of inner plates at a first end of the pair of inner plates, and a second bushing positioned between and operatively connected to the pair of inner plates at a second end of the pair of inner plates. A roller is rotatably mounted on each bushing.

Each of the outer links comprises a pair of outer plates arranged in an opposing manner with first and second pins operatively positioned between and connected to the pair of outer plates at the first and second ends, respectfully, and a central pin operative positioned between and connected to the pair of outer plates between the first and second pins. The inner links are arranged in an overlapping and alternating manner with the outer links such that the first pin of one outer link is received within a second bushing of an adjacent inner link.

DETAILED DESCRIPTION

As required, detailed embodiments of the present disclosure are disclosed herein; however, it is to be understood that the disclosed embodiments are merely exemplary of the disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1A:
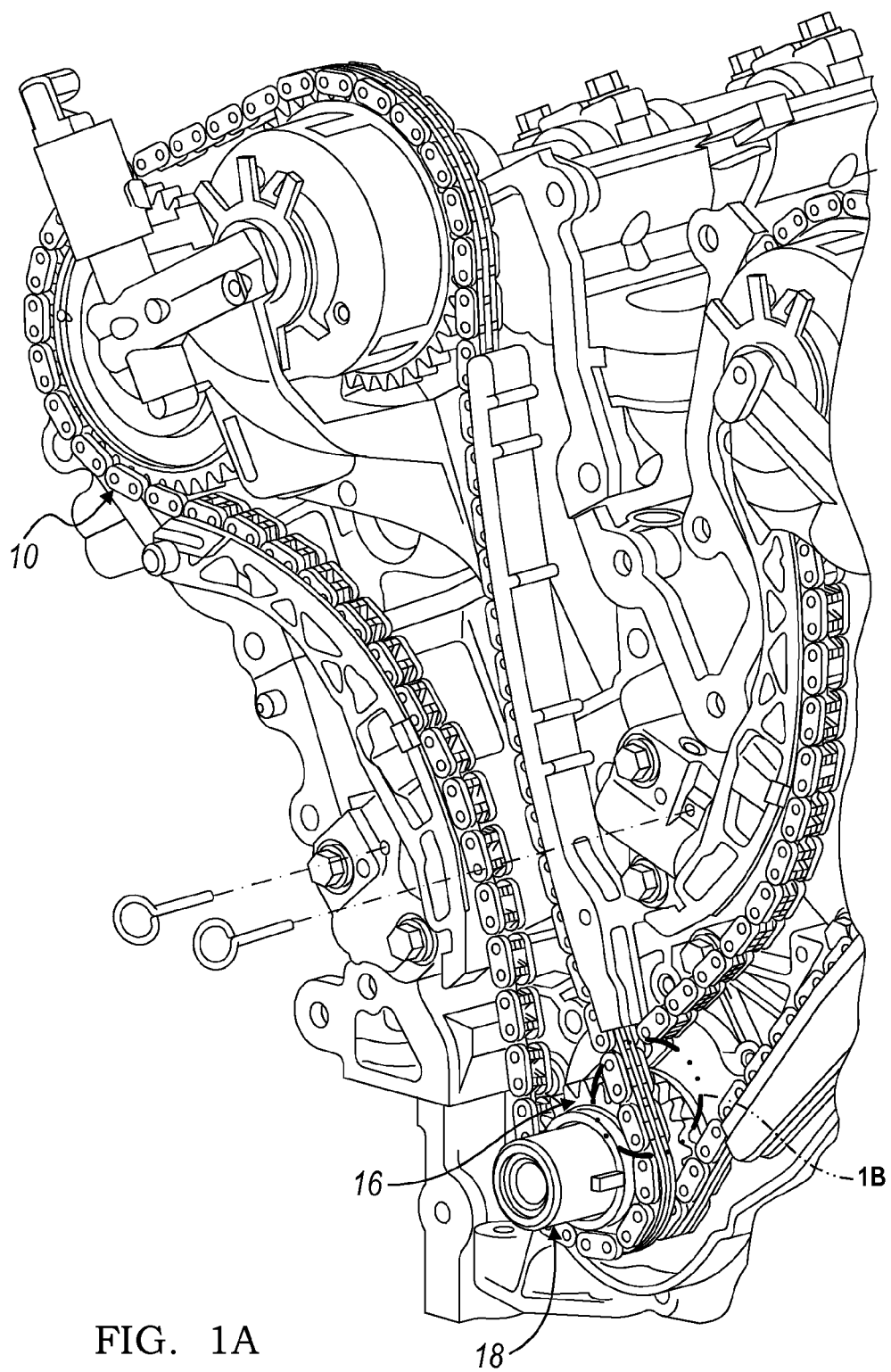
FIG. 1A is a perspective view of a prior art inverted tooth silent drive chain installed in a vehicle.
Figure 1B:
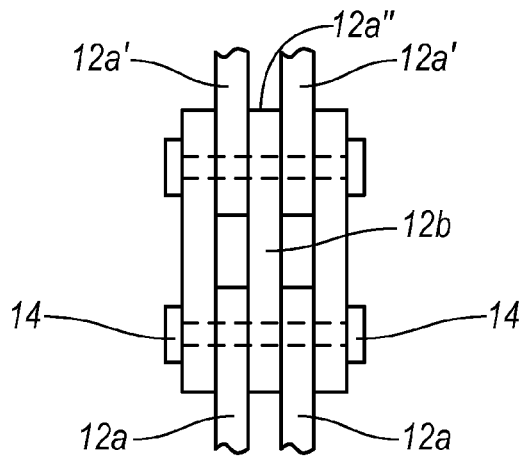
FIG. 1B is a plan view of a portion of the chain shown in encircled portion 1B in FIG. 1A.
Figure 2A:
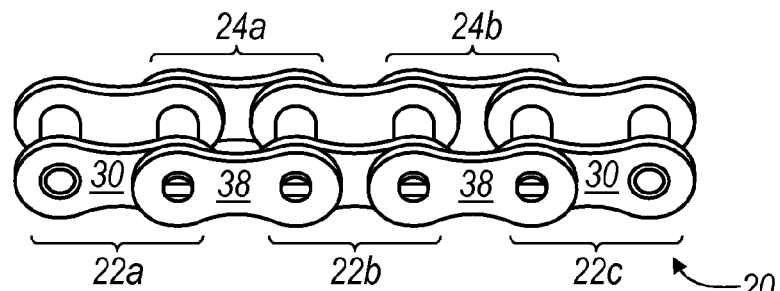
FIG. 2A is a perspective view of a prior art roller chain.
Figure 2B:
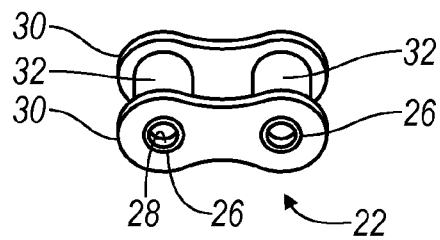
FIG. 2B is a perspective view of an inner link of the roller chain of FIG. 2A.
Figure 2C:
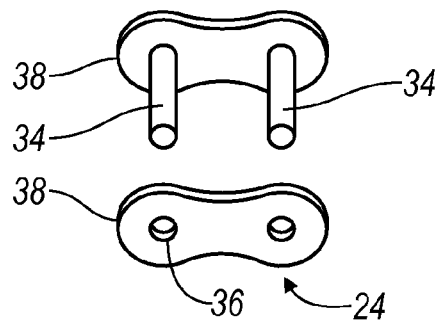
FIG. 2C is a partially exploded view of an outer link of the roller chain of FIG. 2A.
Figure 3:
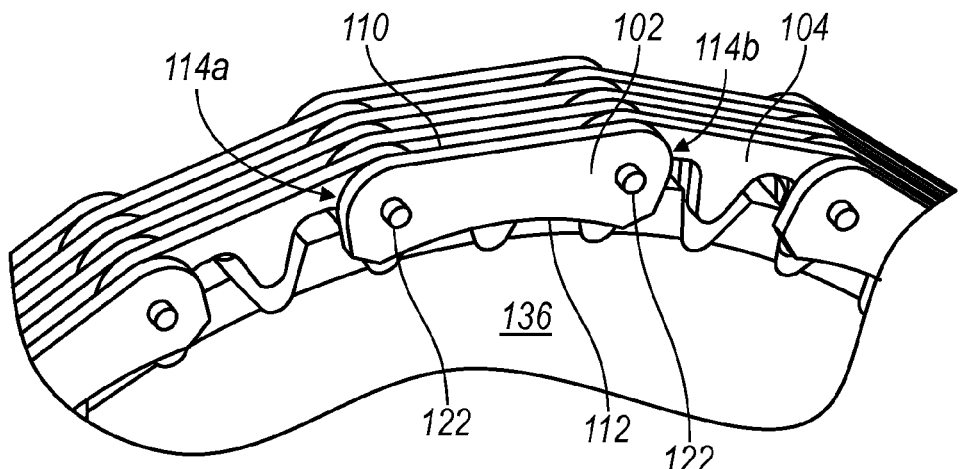
FIG. 3 is a partial perspective view of a drive chain, operatively connected to a cam gear.
Figure 4:
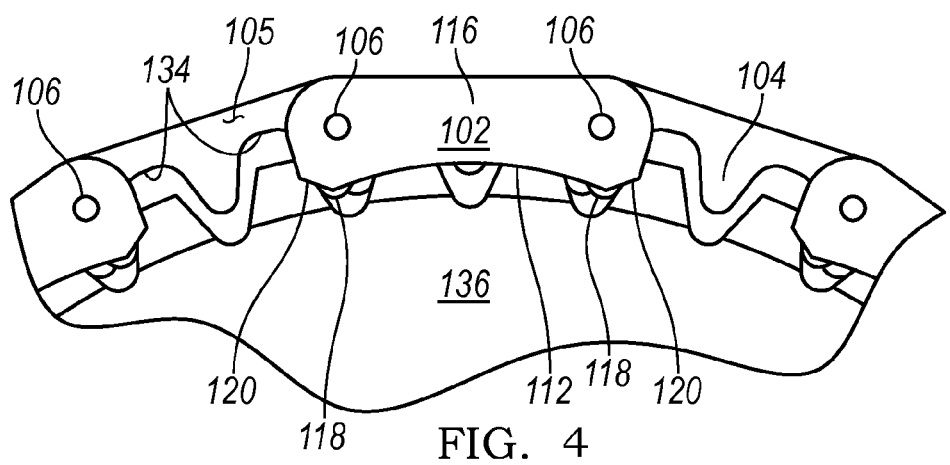
FIG. 4 is a side elevational view of the drive chain of FIG. 3, operatively connected to the cam gear.

Referring to FIGS. 3-10, an exemplary arrangement of a silent drive chain 100 is depicted. The drive chain 100 comprises a plurality of guide link plates 102, a plurality of inner link plates 104, and a plurality of pins 106 that are operatively connected together to form an endless loop, such as that shown in FIG. 1A.

In one exemplary configuration, the guide link plate 102 is defined by a top surface 110, a bottom surface 112, opposing side portions 114a, 114b and a body portion 116. In one exemplary arrangement, at least a portion of the top surface 110 is configured to be generally linear. However, it is also understood that guide link plate 102 may be configured with a shaped surface on either end of the guide link plate 102 as the guide link plate 102 comes into contact with chain guides to allow for lubrication, mitigate NVH and guide wear concerns. For example, in one exemplary arrangement, the ends of the guide link plate 102 may be generally curved.

In one exemplary arrangement, the bottom surface 112 may have a generally curved profile that extends between end points 118 that define opposing side portions 114a, 114b. For example, the bottom surface 112 may be configured with a generally concave shape. However, it is understood that the present disclosure is not limited to such an arrangement. Other shapes of the bottom surface 112 that are configured to cooperate with various sprocket designs and chain to sprocket meshing designs are also contemplated.

In one exemplary arrangement, the opposing side portions 114a, 114b each include an angled bottom end portion 120 that extends upwardly from the end points 118 toward a generally curved end portion 114a, 114b. As may be best seen in FIG. 4, the end portions 120 are angled away from body portion 116.

Disposed within the body portion 116 are openings 122 that are configured to receive the pins 106. The pins 106 are fixedly secured within the openings 122 so as to fix the guide link plates 102 together. The openings 122 are disposed closer to the side portions 114a, 114b than a center of the body portion 116.

Figure 5:
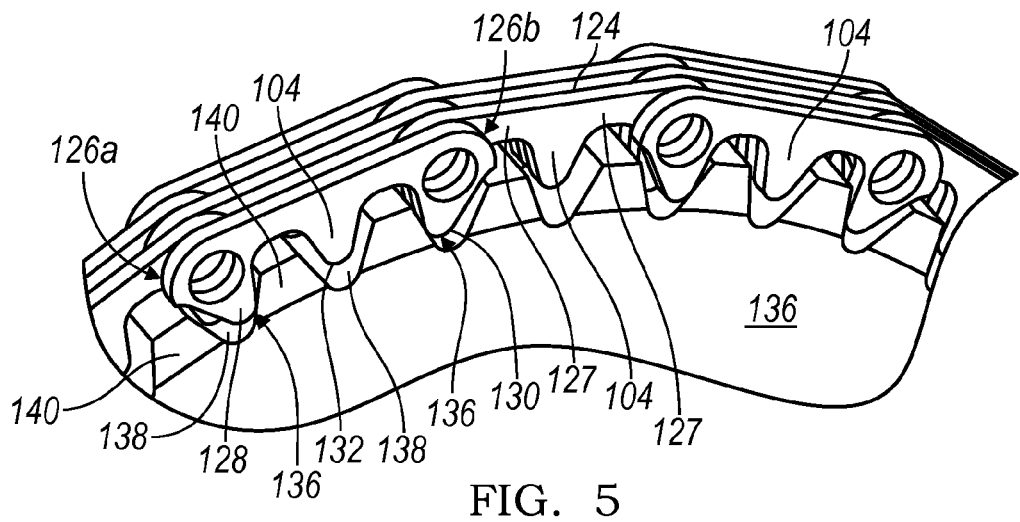
FIG. 5 is a partial perspective view of the drive chain of FIG. 3, with the outermost guide link plates removed.
Figure 6:
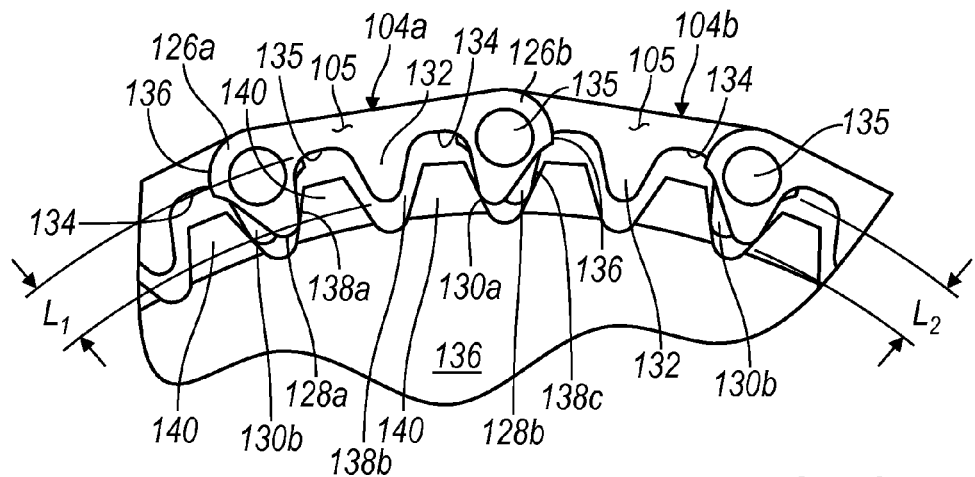
FIG. 6 is a side elevational view of the drive chain of FIG. 3, with the outermost guide link plates removed.
Figure 7:
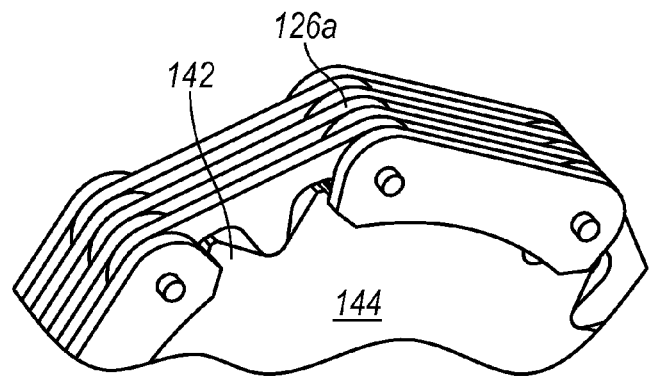
FIG. 7 is a partial perspective view of the drive chain of FIG. 3, operatively connected to a crankshaft gear.
Figure 8:
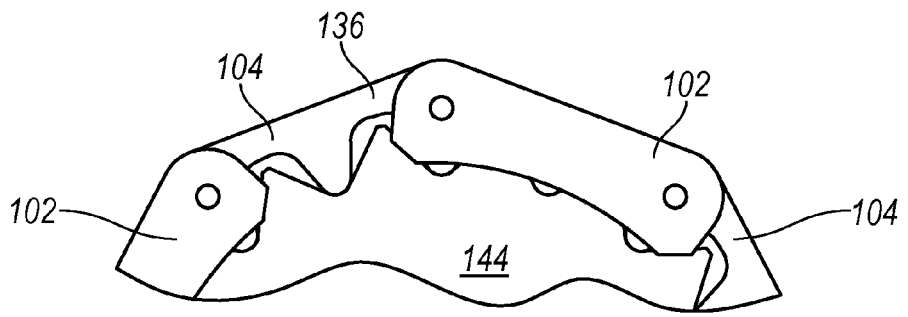
FIG. 8 is a side elevational view of the drive chain of FIG. 3, operatively connected to the crankshaft gear.
Figure 9:
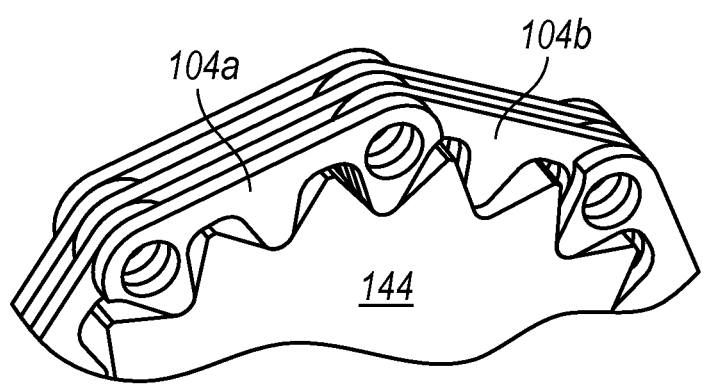
FIG. 9 is a partial perspective view of the drive chain of FIG. 3, with the outermost guide link plates removed.

Inner link plates 104 are best seen in FIGS. 5 and 6, for example. In one exemplary arrangement, each inner link plate 104 is defined by a top surface 124, opposing side portions 126a, 126b and a web portion 127 that extends between opposing side portions 126a, 126b. In one exemplary configuration, the top surface 124 is configured to be generally linear.

Figure 10:
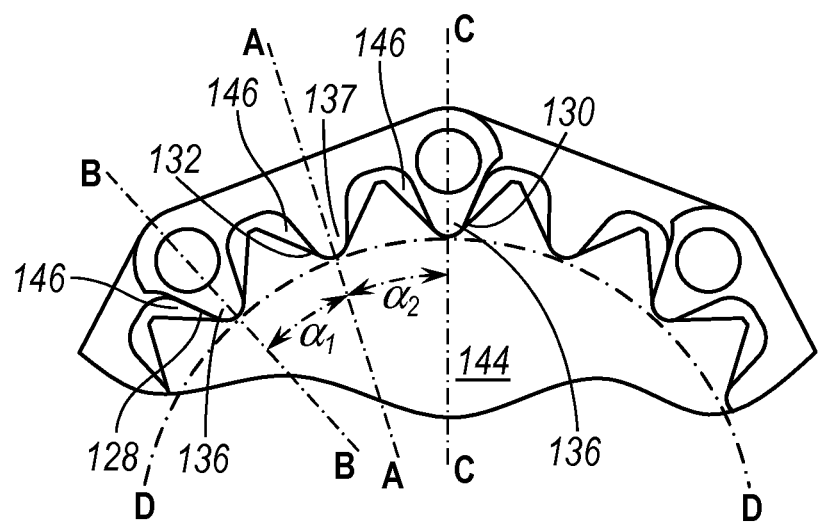
FIG. 10 is a side elevational view of the drive chain of FIG. 3, with the outermost guide link plates removed.

The inner link plates 104 further include teeth that extend away from a web portion 105. More specifically, each inner link plate 104 includes a first side tooth 128, a second side tooth 130 and a central guide tooth 132. A groove 134 is disposed between the first side tooth 128 and the central guide tooth 132, as well as between the second side tooth 130 and the central guide tooth 132. As best seen in FIG. 10, in one exemplary arrangement, an apex 137 of the central guide tooth 132 is arranged along a central axis A-A extending through central guide tooth 132. The first and second guide teeth 128, 130 are both configured with apexes 136. The apex 136 of first guide tooth 128 is arranged along a first tooth axis B-B extending through first guide tooth 128. The apex of second guide tooth 130 is arranged along a second tooth axis C-C extending through second guide tooth 130. As may be seen, first and second guide teeth 128, 130 are configured to extend slightly inwardly, toward central guide tooth 132. For example, in one exemplary arrangement, the central axis A-A and the first tooth axis B-B cooperate to form an acute angle $\alpha_1$. Similarly, the central axis A-A and the second tooth axis C-C also cooperate to form an acute angle $\alpha_2$. Further, as best seen in FIG. 6, in one exemplary arrangement, the central guide tooth 132 is defined by an overall length $L_1$ that is less than an overall length $L_2$ of the first and second side teeth 128, 130, as will be explained in further detail below.

Each of the first and second side teeth 128, 130 are provided with apertures 135, such that the apertures 135 are located adjacent to the opposing side portions 126a, 126b. Apertures 135 are sized to be larger than the openings 122 formed in the guide link plates 102. The opposing side portions 126a, 126b each include a generally curved profile 136.

Referring to FIG. 6, for example, the guide chain 100 may be assembled as follows. A first series of inner link plates 104a are operatively connected to a second series of inner link plates 104b. More specifically, opposing side portions 126b of inner link plates 104a are arranged in an overlapping manner with opposing side portions 126a of inner link plates 104b such that apertures 135 of the overlapping inner link plates 104a, 104b are aligned. This arrangement results in a portion of inner link plates 104a being sandwiched between adjacent inner link plates 104b, as may be seen in FIG. 5, for example. While the Figures illustrate a series of three inner link plates 104a and a series of two inner link plates 104b, it is understood that the present disclosure is not limited to such an arrangement.

Guide link plates 102, which are omitted from FIGS. 5-6 and 9-10 for ease of illustration, are arranged on either side of the series of inner link plates 104b. Pins 106, which are also omitted from several of the figures for ease of illustration, are disposed through the aligned apertures 135 of the first and second series of inner link plates 104a, 104b. In operation, the inner link plates 104 articulate about the pins 106, as a gear 136 rotates.

Operation of the gear chain 100 will now be described in connection with operation of a vehicle. However, it is understood that gear chain 100 may be used in other applications. FIGS. 3-6 illustrate gear chain 100 mounted on a cam gear 136. The guide link plates 102 are positioned so as to straddle cam gear 136. Inner link plates 104a, 104b are positioned on cam gear 136 such that first and second side teeth 128, 130 and central teeth 132 are at least partially disposed within grooves 138 formed between adjacent gear teeth 140. The first and second side teeth 128, 130 are sized to be seated within the grooves 138 of the cam gear 136 such that one of the first and second side teeth 128, 130 of connected first and second inner link plates 104a, 104b engages with a gear tooth 140. More specifically, as illustrated in FIG. 6, first side tooth 128a of inner link plate 104a is disposed within the same groove 138a as a second side tooth 130b. Due to the inwardly extending configuration of the second side tooth 130b, a portion of that tooth 130b will engage against gear tooth 140. However, due to the inwardly extending configuration of first side tooth 128a of inner link plate 104a, first side tooth 128a may not engage the gear tooth 140. On the other side of the first inner link plate 104a, the second side tooth 130a of the inner link plate 104a is disposed within the same groove 138c as the first side tooth 128b of the inner link plate 104b. The inwardly extending configuration of the second side tooth 130a causes the second side tooth 130a to engage against the gear tooth 140. However, the first side tooth 128b of the inner link plate 104b may not engage the gear tooth 140. This configuration provides that only some of the first and second side teeth 128a, 128b, 130a, 130b engage the gear teeth 140 at any time, thereby reducing wear and friction, as well as reducing noise, vibration, and harshness (NVH).

Further, as is best illustrated in FIG. 6, because the central teeth 132 are configured to have an overall length $L_1$ that is less than a depth of the grooves 138 of adjacent gear teeth 140, and thus less than the overall length $L_2$ of the side teeth 128, 130, the central teeth 132 also do not engage or contact gear teeth 140 within grooves 138b. This arrangement further serves to increase durability of a drive chain, as there is no contact or engagement with the gear teeth 140 of the cam gear 136.

In an internal combustion engine, timing chains are typically configured with a 2:1 ratio from cam gear 136 to a crankshaft gear 144. Thus, and in contrast to the cam gear, where it may be desirable to reduce link teeth 128, 130, 132 to gear teeth 140 contact for purposes of reducing NVH, wear and friction, the link teeth 128, 130, 132 should be configured to fully engage with the gear teeth 142 of a crankshaft gear 144. As shown in FIGS. 7-10, when drive chain 100 is engaged with the crankshaft gear 144, all of the link teeth 128, 130, 132 are seated within grooves 146 disposed between adjacent gear teeth 142. The inwardly extending configuration of the side teeth 128, 138 allow the inner link plates 104 to extend across two gear teeth, while fully engaging three link teeth 128, 130, 132 with grooves 146 of crankshaft gear 144. Indeed, the angled configuration of the first and second teeth 128, 130 thus allow for the apexes 136, 137 of the first, second and central guide teeth 128, 130, 132 to be disposed on a common inscribed arc D-D. In one exemplary arrangement, the apex 136 of the respective first and second side teeth 128, 130 is defined by a radius that is the same as a radius that defines an apex of the central guide tooth. Thus the apexes 136, 137 of the link teeth 128, 130, 132 to fully seat in the grooves 146. In contrast to the configuration shown in FIGS. 7-10, prior art designs, such as that shown in FIG. 1A, only span across a single gear tooth.

The number of links pins has been found to be directly related to the likelihood of chain stretch, which is considered a major failure mode. Overall chain weight and dynamic loading are also considered contributors to overall durability concerns. However, the arrangement shown in FIGS. 3-10 effectively reduces the number of link plates and link pins required for a drive chain 100 assembly, thereby reducing chain mass. Moreover, potential chain stretch is also reduced, as the number of chain wear contact points is also reduced due to the longer span of the link plates. Use of fewer pins 135 serves to lower guide friction, as well as improve NVH issues. In addition, fewer pins also contribute to reduced tooth wear, and increased durability of the chain.

Figure 11:
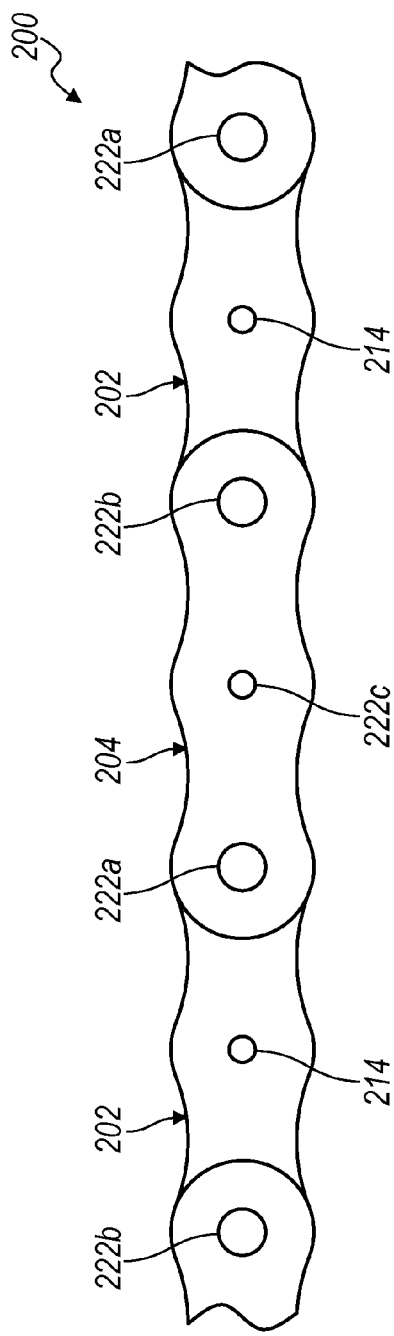
FIG. 11 is a partial elevational view of a drive chain.
Figure 12:
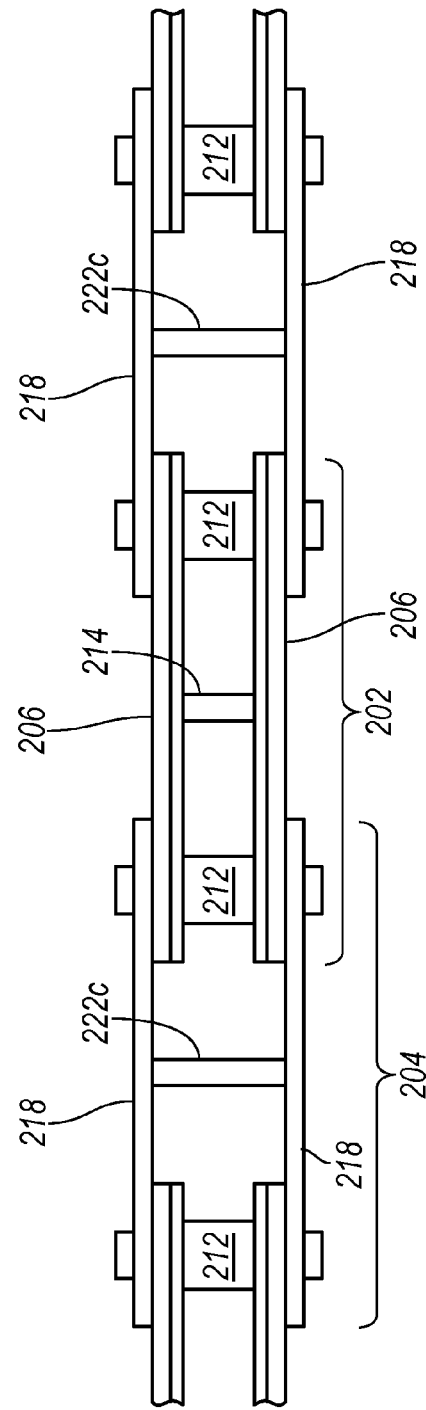
FIG. 12 is a partial plan view of the drive chain of FIG. 11.
Figure 13:
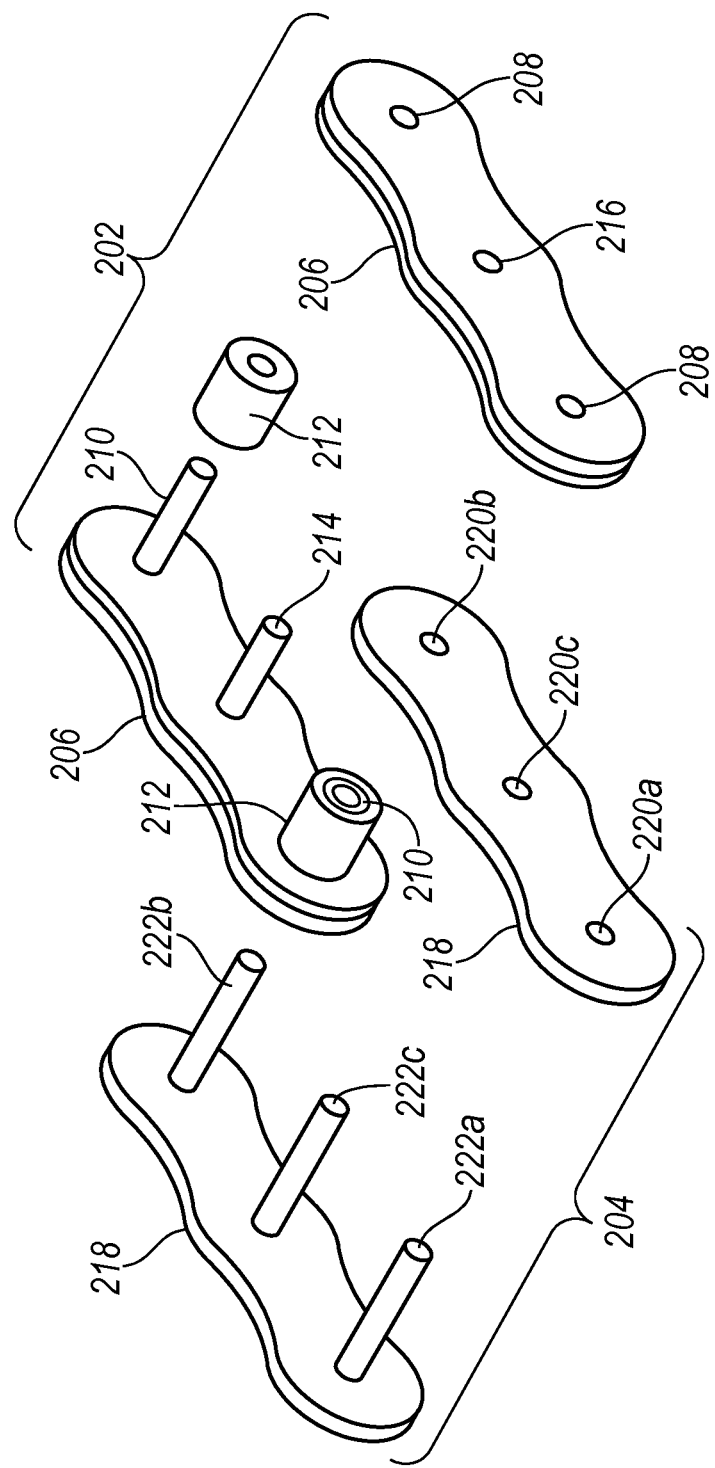
FIG. 13 is a partial exploded view of components of the drive chain of FIGS. 11-12.

While one exemplary arrangement of the disclosure has been described in connection with a silent chain, FIGS. 11-13 illustrate an alternative exemplary arrangement of a roller drive chain 200. Drive chain 200 includes a plurality of inner links 202 and a plurality of outer links 204 that are arranged in an alternating manner. Each inner link 202 comprises a pair of inner plates 206, with a pair of bushing holes 208 into which ends of two generally cylindrical bushings 210 are respectively press-fit. The bushing holes 208 are disposed on either end of the inner plate 206. A roller 212 fits rotatably on each bushing 210. A pin 214 is press fit into pins holes 216 formed on a center section of each inner plate 206.

Figure 14:
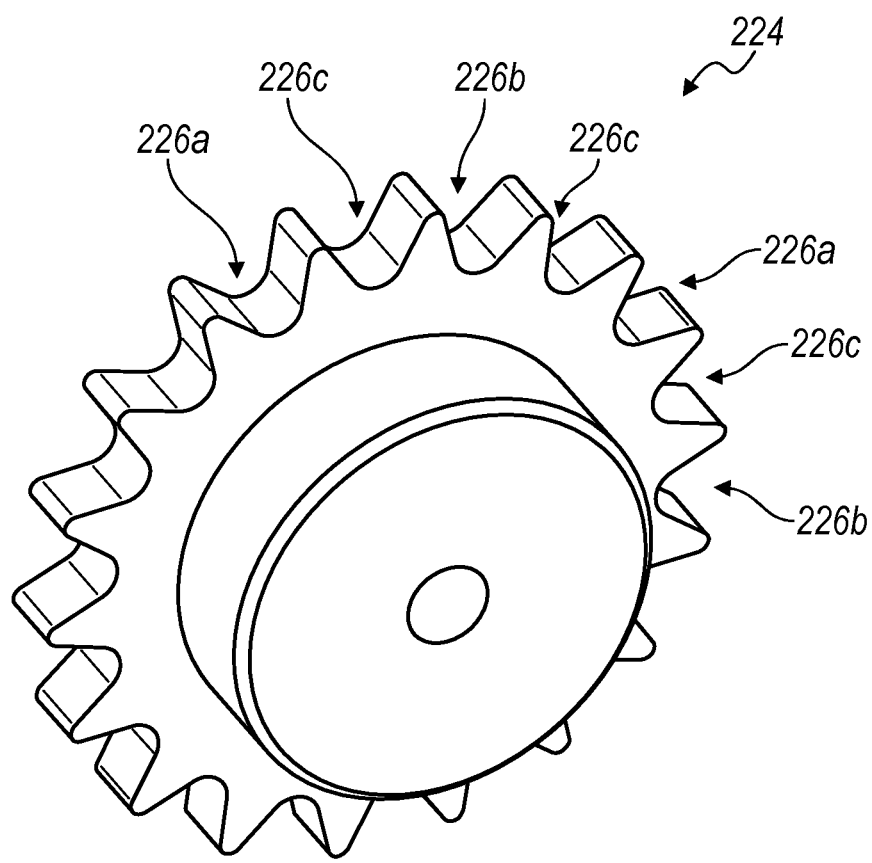
FIG. 14 is a perspective view of a driving sprocket.

Each outer link 204 comprises a pair of outer plates 218, with pin holes 220 into which ends of pins 222 are press fit. As may be seen in FIG. 13, each outer plate 218 has three pin holes 220a, 220b, 220c, with pin holes 220a and 220b being position one either end of the outer plate 218 and pin hole 220c being positioned in a center section of each outer plate 218. Pins 222a and 222b are disposed in pin holes 220a and 220b, respectively. Pins 222a and 222b are configured to extend through a bushing 210 of an adjacent inner link 202, fitting loosely therein so that the outer link 204 is in an articulating relationship to form a flexible roller chain 200. The flexible roller drive chain 200 can engage a driving sprocket 224 (shown in FIG. 14), and at least one driven sprocket (not shown) to form a chain transmission in which power is transmitted from the driving sprocket to one or more driven sprockets.

Unlink prior art designs where rollers are received within each groove of a sprocket, drive chain 200 is configured such that the rollers 212 are separated by a pin 214/222c. Thus, when installed on a sprocket 224, rollers 212 are received within grooves 226a and 226b, while pins 214, 222c are disposed within grooves 226c. However, as pins 214, 222c have a substantially smaller diameter than rollers 212, pins 214, 222c do not contact grooves 226c, thereby reducing wear and friction, as well as NVH.

Moreover, roller chain 200 has a reduced chain weight than prior art designs as the number of link plates, as well as rollers are reduced. Reduction of the number of articulating connections in drive chain 200 also serves to minimize potential chain stretch.

While exemplary embodiments are described above, it is not intended that these embodiments describe all possible forms of the invention. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:
1. A tooth-shaped link member, comprising:
a web-portion having a top linear surface;
first and second teeth, each having an aperture; and
a central tooth;
the central tooth disposed along a central-axis orthogonal to the top linear surface and extending through a central tooth apex, the first and second teeth each disposed along respective axes that extend through a center-point of each respective aperture and tooth apex, the respective axes angled toward the central axis.

2. The tooth shaped link member of claim 1, wherein the link member is defined by first and second opposing side portions, and wherein the first tooth extends from the first side portion and wherein the second tooth extends from the second side portion.

3. The tooth shaped link member of claim 1, wherein an overall length of the central tooth as measured along an axis extending from a bottom edge of the web portion to the apex of the central tooth is less than an overall length of each of the first and second teeth as measured from the bottom edge of the web portion to the apex of the first and second teeth, respectively.

4. The tooth shaped link member of claim 3, wherein the first and second teeth have the same overall length.

5. The tooth shaped link member of claim 1, wherein the first tooth is separated from the central tooth by a first groove, and wherein the central tooth is separated from the second tooth by a second groove.

6. A drive chain, comprising:
a first series of inner link plates;
a second series of inner link plates; and
a plurality of pins;
wherein each of the inner link plates of the first and second series of inner link plates comprise:
a web portion extending between opposing side portions and having a top linear surface;
a first side tooth with an aperture;
a second side tooth with an aperture; and
a central guide tooth;
wherein the first side tooth is separated from the central guide tooth by a first groove, and wherein the central guide tooth is separated from the second side tooth by a second groove;
wherein the central guide tooth is disposed along a central axis that is orthogonal to the top linear surface and extends through an apex of the central guide tooth,
wherein the first side tooth and the second side tooth are each disposed along respective axes that extend through a center-point of each respective aperture and tooth apex, the respective axes oriented at an angle such that apexes of the first and second side teeth extend toward the central axis; and
wherein the first series of inner link plates are operatively connected to the second series of inner link plates by the pins such that a portion of the first series of inner link plates overlaps with a portion of the second series of inner link plates so as form an endless loop.

7. The drive chain of claim 6, wherein apertures of the first series of inner link plates are aligned with apertures of the second series of inner link plates.

8. The drive chain of claim 7, wherein each of the inner link plates of the first series of inner link plates are separated from one another by one of the inner link plates from the second series of inner link plates.

9. The drive chain of claim 6, wherein an overall length of the central guide tooth as measured from a bottom edge of the web portion to the apex of the central tooth is less than an overall length of the first and second side teeth as measured from the bottom edge of the web portion to the apex of the first and second teeth, respectively.

10. The drive chain of claim 9, wherein the first and second side teeth have the same overall length.

11. The drive chain of claim 6, further comprising a series of guide link plates arranged in pairs that are operatively connected to the first and second inner link plates.

12. The drive chain of claim 11, wherein each of the guide link plates comprise a body portion defined by opposing side portions and having a curved bottom edge.

13. The drive chain of claim 12, wherein the guide link plates further include an angle bottom end portion that extends upwardly from end points of the curved bottom edge.

\* \* \* \* \*